(12) United States Patent
Chen

(10) Patent No.: US 9,854,641 B2
(45) Date of Patent: Dec. 26, 2017

(54) SMART HOME-CARE LIGHTING SYSTEM

(71) Applicant: Kaipo Chen, Taoyuan (TW)

(72) Inventor: Kaipo Chen, Taoyuan (TW)

( * ) Notice: Subject to any disclaimer, the term of this patent is extended or adjusted under 35 U.S.C. 154(b) by 0 days.

(21) Appl. No.: 15/133,236

(22) Filed: Apr. 20, 2016

(65) Prior Publication Data

US 2016/0234414 A1 Aug. 11, 2016

Related U.S. Application Data

(63) Continuation-in-part of application No. 14/258,029, filed on Apr. 22, 2014, now Pat. No. 9,571,712.

(30) Foreign Application Priority Data

Mar. 12, 2014 (CN) ............................ 2014 1 0089724
Mar. 15, 2016 (CN) ............................ 2016 1 0146308

(51) Int. Cl.
*H05B 37/02* (2006.01)
*H04N 7/18* (2006.01)
(Continued)

(52) U.S. Cl.
CPC .............. *H05B 37/02* (2013.01); *F21S 8/026* (2013.01); *F21S 8/061* (2013.01); *F21V 23/003* (2013.01); *F21V 23/004* (2013.01); *F21V 33/0052* (2013.01); *F21V 33/0056* (2013.01); *F21V 33/0076* (2013.01); *G08B 7/06* (2013.01); *G08B 17/00* (2013.01); *G08B 19/005* (2013.01);
(Continued)

(58) Field of Classification Search
None
See application file for complete search history.

(56) References Cited

U.S. PATENT DOCUMENTS 6,002,430 A * 12/1999 McCall .............. H04N 5/23238
348/143
7,467,881 B2 * 12/2008 McMillen ............... F21S 8/026
362/147

(Continued)

OTHER PUBLICATIONS

UHow Z-Wave Controllers and Devices Work, 2012, available online at http://www.vesternet.com/resources/technology-indepth/how-z-wave-controllers-work.*

*Primary Examiner* — David N Werner
(74) *Attorney, Agent, or Firm* — Leong C. Lei

(57) ABSTRACT

A smart home-care lighting system includes a lighting device having a portion that is light transmittable. The lighting device receives therein an illumination module for purpose of illumination, a detection module for detecting an outside environment, an alarm module and a sound effect module operable in combination with the detection module for indication and alarming, and an image pickup module for capturing and recording images. The lighting device also includes, arranged therein, a microprocessor and a main control module for transmitting and storing personal habits and health information. The device is arranged such that image can be captured in ranges that does not overlap to provide a surveillance range of 360-degree full view and operation can be made with the main control module for determination for proper action to be taken and may be used in combination with household appliances to construct a smart home-care system that benefit home members.

8 Claims, 13 Drawing Sheets

(51) Int. Cl.
*F21V 23/00* (2015.01)
*G08B 21/04* (2006.01)
*G08B 17/00* (2006.01)
*G08B 19/00* (2006.01)
*F21S 8/02* (2006.01)
*F21S 8/06* (2006.01)
*F21V 33/00* (2006.01)
*G08B 7/06* (2006.01)
*F21S 8/04* (2006.01)
*G08B 25/14* (2006.01)
*F21S 9/02* (2006.01)
*H04N 5/225* (2006.01)
*G08B 13/196* (2006.01)
*F21Y 105/18* (2016.01)
*F21K 9/233* (2016.01)
*F21Y 115/10* (2016.01)
*F21Y 113/10* (2016.01)
*F21K 9/238* (2016.01)

(52) U.S. Cl.
CPC ....... *G08B 21/043* (2013.01); *G08B 21/0469* (2013.01); *H04N 7/18* (2013.01); *H04N 7/181* (2013.01); *H04N 7/183* (2013.01); *H05B 37/0272* (2013.01); *F21K 9/233* (2016.08); *F21K 9/238* (2016.08); *F21S 8/04* (2013.01); *F21S 9/024* (2013.01); *F21V 23/005* (2013.01); *F21V 23/006* (2013.01); *F21Y 2105/18* (2016.08); *F21Y 2113/10* (2016.08); *F21Y 2115/10* (2016.08); *G08B 13/19619* (2013.01); *G08B 25/14* (2013.01); *H04N 5/2252* (2013.01); *H04N 5/2256* (2013.01); *H05B 37/0227* (2013.01); *H05B 37/0236* (2013.01); *H05B 37/0245* (2013.01)

(56) References Cited

U.S. PATENT DOCUMENTS

| | | | | |
|---|---|---|---|---|
| 9,228,731 | B2* | 1/2016 | Chen | H04N 7/183 |
| 9,429,517 | B2* | 8/2016 | Chen | G01N 21/55 |
| 2010/0148672 | A1* | 6/2010 | Hopper | F21V 23/0435 |
| | | | | 315/113 |
| 2016/0150135 | A1* | 5/2016 | Chen | F21V 33/0052 |
| | | | | 348/151 |

\* cited by examiner

SMART HOME-CARE LIGHTING SYSTEM

CROSS-REFERENCE TO RELATED APPLICATION

This is a continuation-in-part of co-pending U.S. patent application Ser. No. 14/258,029 filed on Apr. 22, 2014 and owned by the present applicant.

TECHNICAL FIELD OF THE INVENTION

The present invention relates generally to a smart home-care lighting apparatus, in which an image pickup module capable of recognizing a target in a range of 360 degrees is involved in order to integrate a function of environment detection condition and allows for using lighting and sound for alarming and indication to provide better protection to the living of family members.

DESCRIPTION OF THE PRIOR ART

With the light-emitting diode (LED) technology getting mature in various applications, in addition to the development of techniques regarding energy saving and lighting, manufacturers also focus on the development of styles and functions of LED related devices available in the market to provide multiple functions associated therewith.

The progress of medical science and the improvement of health and welfare and the gradual reduction of average global fertility rate, the population structure is now in a trend toward an aging society. This causes an increasing expansion of home care nursing market. However, nursing human resources are under supply and may not be timely provided for ordinary homes and are quite expensive also. To suit the needs of regular families, devices that are operable for or in combination with remote care have been recently available. Those devices, although being widely welcome and purchased popularly, still suffer certain drawbacks for further improvement, such as surveillance being not flexible and having dead zone in the surveillance range and poor interaction.

SUMMARY OF THE INVENTION

The present inventor has been working in the field of research and study and manufacture of LED (Light-Emitting Diode) for years and have previously proposed various surveillance/monitoring systems that are combined with lighting devices and have collected experiences of use and feed back from users of similar devices of this kind so as to full aware of the needs of the general consumers in this respect. Thus, the remote surveillance and monitoring devices that have been briefly discussed above for home caring, if constructed as a stand-alone device for easy and convenient use, would perfectly suit the need for home care and would provide a more intelligently controllable household surveillance environment.

For example, US Patent Publication No. 2008/0177646 A1 discloses a work site remote monitoring and employee time tracking system, wherein image of surveillance, together with on-site biometric scanning data, is transferred through a network to a management end in order to determine the movement and behavior of the employees for the purpose of management. Such a system needs an additional device used in combination therewith, making it imperfect and inconvenient in use. Further, Japanese Patent Application No. 2012-22579 discloses an LED lighting device in which a standing wave radar is included for detecting the distance and biological or physiological conditions of a human body for driving a light source and an alarm, and is applicable to buildings, transportation vehicles, and even roads. However, a major drawback is that efficient and accurate detection of abnormality of a human body is generally not available and the range of detection is generally short, making it difficult for applications in a household or interfering environment.

The present invention provides a lighting device that is combined with multiple techniques of detection and remote surveillance and monitoring to improve, fundamentally, detection functions having low accuracy for integration with electrical appliances commonly used in a household environment and to determine physical conditions of a person through the system for combination with corresponding devices such that the present invention combined with the lighting device provides a multifunctional household surveillance and monitoring system, which is easy and convenient in actual applications.

The present invention provides a smart home-care lighting system, which comprises a lighting device comprising a cover of which at least a portion is light transmittable. The lighting device is provided, in the interior thereof, with an illumination module for purpose of lighting, an image pickup module for capturing images in non-overlapping ranges, a detection module for detecting environment conditions, an alarm module for indicating and notifying the detected environment conditions, and a sound effect module. These modules are electrically connected to a main control module. The main control module comprises a chip for transmission of information in order to establish connection with for example a tablet computer, a smart phone, a handheld or wearable device, and an in-vehicle information (IVI) system. Further, the main control module is operable to compare information acquired in order to activate/deactivate a corresponding function. Further, the main control module may store therein data related to a user in order to establish personal health record (PHD) for bettering personal health information.

The present invention make uses of an image pickup module to expand a range of image capturing to 360 degrees in order to improve the image capturing range and is capable of integrating information acquired through detection conducted by other constituent modules for subsequent transmission to a main control module for decision making and also allowing for connection with household electrical appliances for better integration of home environment, according to the setting values thereof, for being more intelligent, better suit to personal habits and preferences, and providing better protection of healthy of home members and improving living quality and security. For better understanding of the present invention that is provided for achieving the above objects, technical solution adopted in the present invention, and advantages thereof, will be described with reference to preferred embodiments in combination with the attached drawings.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Better understanding of the present invention can be achieved according to a general detailed description of the present invention, as well as a preferred feasible embodiment thereof, in combination with the attached drawings. The present invention provides a smart home-cue lighting system.

Figure 1:
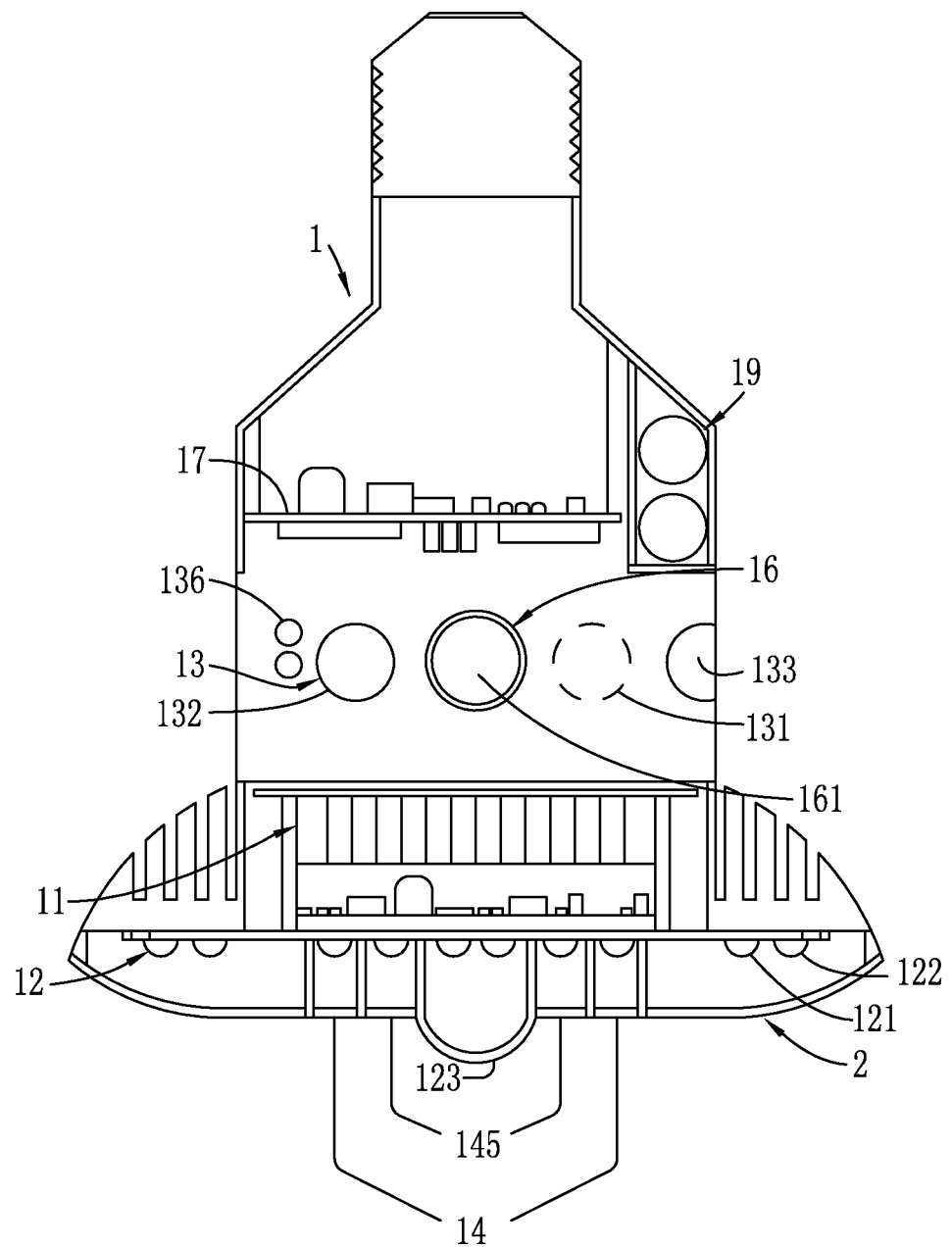
FIG. 1 is a schematic view illustrating inside structure of the present invention.
Figure 2:
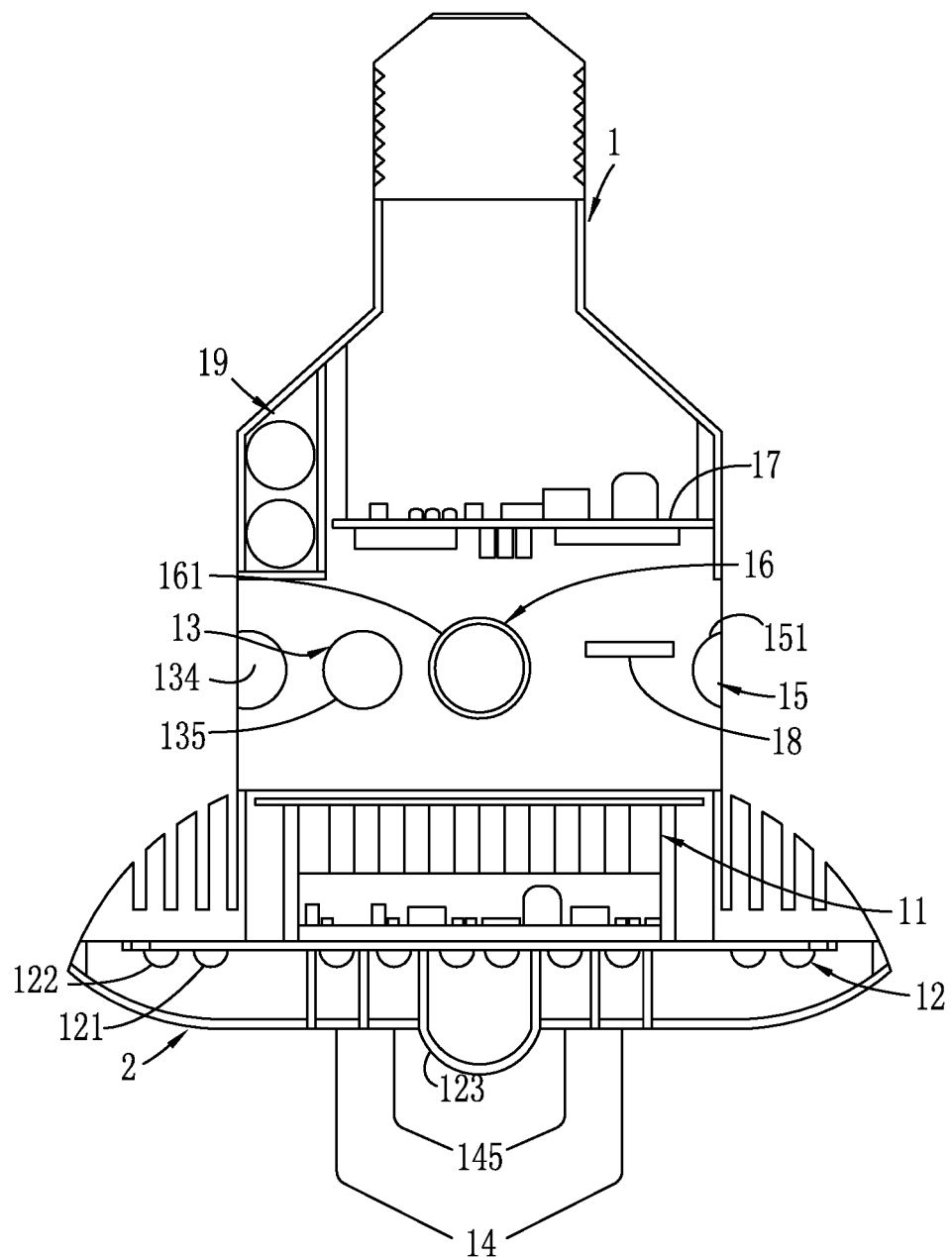
FIG. 2 is a schematic view, taken from an opposite side, illustrating the inside structure of the present invention.
Figure 3:
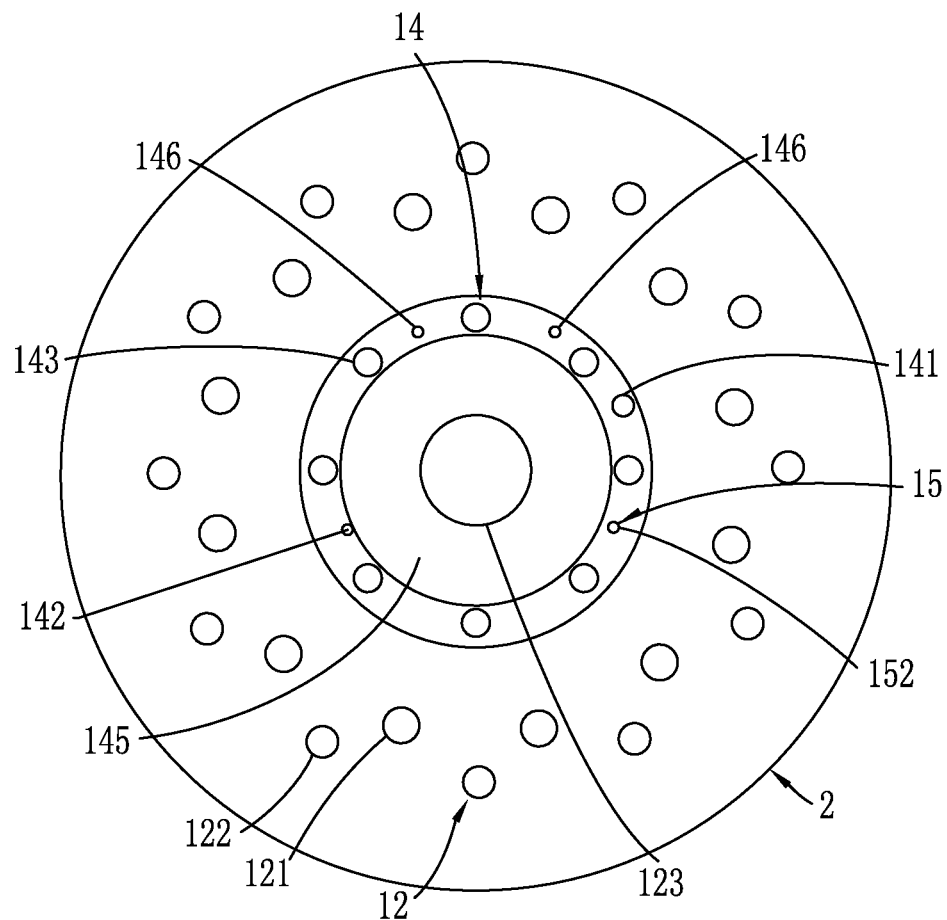
FIG. 3 is a schematic bottom view of a lighting apparatus according to the present invention.

Shown in FIGS. 1-3 comprise: a lighting device (1), of which at least a part comprises a cover (2) that is light transmittable, the cover (2) being integrally formed with the lighting device (1), or being alternatively of a separate design, or being further alternatively totally omitted, having a primary design purpose for allowing light to project outward from the interior, but not limited to the means discussed and mentioned above; an illumination module (12) that is arranged in the interior of the lighting device (1) to generate illumination lighting that transmits through the cover (2) to project to the outside of the lighting device (1); a detection module (13) that is arranged in the interior of the lighting device (1) to detect environment conditions of the outside of the lighting device (1) and is connected to one or more alarm modules (14) and a sound effect module (15) that are also arranged in the interior of the lighting device (1) for purposes of indication and reminder; an image pickup module (16) that is at least one camera (161) arranged in the interior of the lighting device (1) at a location that is set in such a spatial range as not to repeatedly capture images, wherein a viewable angle of the camera (161) is often limited due to difference of focus length so that the non-repeatedly capturing image range mentioned above is more specifically defined as an arrangement that viewable angles of cameras (161) do not overlap each other and can be an arrangement in either a horizontal direction or a vertical direction, where more specifically, a single one of the camera (161) covers 180 degrees and in an embodiment of the present invention, two cameras (161) are involved for constructing a full view of 360 degrees so that bettered expansion of a household environment or a range of image recording of a target object (3) that is under monitoring or surveillance can be achieved and surveillance or monitoring of no dead zone can be realized without an additional operation for adjusting the angles thereof. Further, the camera(s) (161) can be of a single unitary assembly that comprises, in the interior thereof, two or more than two lenses to achieve the purpose of being free of dead zone, but is not limited to the above context of description.

A main control module (11) comprises, arranged therein, a microprocessor and a chip for transmission of information and relies on power supplied from a power supply board (17) to be driven for operation. The chip is operable for establishing connection through means including WIFI, Bluetooth, and wireless control with for example a tablet computer, a smart phone, a handheld or wearable device, an in-vehicle infotainment (IVI) system, or a device, which is operable for collecting and storing data related to a user to establish a personal health record (PHD). The main control module (11) is arranged in the interior of the lighting device (1) and is electrically connected to the modules/components discussed so as to conduct an operation of comparison of information supplied thereto with preset thresholds loaded in the microprocessor that is included in the main control module (11) for processing and identifying feedback information in order to activate or de-activate related function. The lighting device (1) is further provided with at least one memory card slot (18) for transferring and carrying of images recorded thereby or for increasing an additional time interval available for recording of images. Each of the above-discussed modules can be made in the form of a single "board" or multiple "boards" but is not limited so.

The detection module (13) comprises: a living organism identification module (131) that detects a location and body performance of a target object (3), a humidity/temperature sensor module (132) that detects temperature/humidity of the environment outside the lighting device (1), a smoke sensor module (133) that detects smokes in the environment outside the lighting device (1), a gas sensor module (134) that detects harmful gases outside the lighting device (1), an air sensor module (135) that detects contents of suspending particles in the atmosphere of the environment outside the lighting device (1), and an infrared transceiver (136) that receives an input of an external signal, wherein all the modules feed information acquired thereto back to the main control module for identification of the target object (3) and the set standards of the environment thereof for the purposes of activating the corresponding ones of the alarm modules (14).

The illumination module (12) comprises: a warm light LED (121), a cold light LED (122), and a secondary illumination light (123). The secondary illumination light (123) is arranged in an annular form and is set at a center of the lighting device (1), while the warm light LEDs (121) and the cold light LEDs (122) are arranged annularly and circumferentially around the secondary illumination light (123) and on a light board to constitute a dual-layer circumferential arrangement, where the warm light LEDs (121) are in an inner circumferential layer or an inner circle, while the cold light LEDs (122) are in an outer circumferential layer or an outer circle. Further, the secondary illumination light (123) is provided, in the interior thereof, with a light sensor such that the illumination module (12) may automatically regulate light, by means of the main control module (11), to correspond to the environment or may be controlled and operated by an input instruction supplied through external connection and may store and use preferential settings of various users, such as operating in combination with a mobile application (APP) of a mobile phone to change to scenario lighting or to easily vary the surrounding atmosphere for specific holidays or festivals.

The indicator light assembly (14) comprises an IP setting indicator (141), a temperature/humidity indicator (142), a smoke/gas alarm light (143), a gas indicator (144), an air quality indicator (145), and a smoke indicator (146), all the indicators being driven to give off light as an alarm or indication or reminder based on determination made according to information acquired by each of the constituent modules of the detection module (13) and fed back to the main control module (11), wherein the number of the indicators or lights can be increased or decreased according to an actual need and is not subjected to any specific limitation or constraint, provided that clear indication can be obtained with the indicators or lights.

Further included is a backup power compartment (19), which is arranged in the interior of the lighting device (1) for receiving installation of a power supply device that is commercially available. The backup power compartment (19) is electrically connected to the previously discussed power supply board (17) for supplying additional electrical power to drive the entire household surveillance/monitoring system in case of insufficiency or shortage of power supply. The sound effect module (15) comprises a microphone (152) and a speaker (151) primarily for effects of receiving and recognition, voice control, and broadcasting.

Further, with the functions provided by the above-discussed modules, the gas sensor module (134) detects harmful gases in the environment and the smoke sensor module (133) detects smokes in the environment such that the smoke/gas alarm light (143) corresponding thereto transmits a corresponding message to a wireless device and starts to flash for alarming and broadcasting for alarming when a detection result exceeds a threshold, wherein when the most dangerous level has been reached, the detection data and image are transmitted to a fire department. The smoke indicator (146) and the gas indicator (144) are lit in normal operations for recognition of normal operations thereof. The two detection or sensor modules are maintained in an activated condition and kept in operation with higher priority in case of power failure or shortage or insufficiency of power supply for purposes of preventing common catastrophes or hazards, such as fire and gas explosion, in order to provide a safe household and living environment. The air sensor module (135) primarily functions to track or identify air or atmosphere quality and generally conducts detection of suspending particles contained in air or atmosphere and transmits related messages to a wireless device, and the air quality indicator (145) that is provided to correspond thereto generally gives off different colors of light for extended periods of time to indicate the current condition of air quality, wherein blue light indicates normal quality, yellow for acceptable quality, and red for poor quality; however, the colors can be changed according to actual needs or can be variably set during the manufacturing thereof, not limited to the colors mentioned above. The humidity/temperature sensor module (132) conducts detection of temperature and humidity of air or atmosphere and the detected data are fed back to the main control module (11), allowing the main control module (11) to transmit messages to the wireless device, and the temperature/humidity indicator (142), which is provided to correspond thereto, is generally lit during a normal operation thereof to ensure the normal operation of the detection function thereof The chip included in the main control module (11) is provided for process information captured or acquired by the image pickup module (16) in order to identify the temperature or movement of the target object (3) and determine if the target object (3) in the environment is a human body or a pet. Further, the living organism identification module (131) detects the location and body performance of the target object (3) and is generally embodied as a Doppler radar, wherein data can be acquired through the frequency of amplitude. The living organism identification module (131) is generally not affected by the material that makes the lighting device (1) and can be concealed in the interior thereof to make the outside appearance aesthetic. More specifically, he operation is based on a moving signal of a high frequency band of a breath signal so that when a breath signal is identified and, based on a moving signal, it is identified according to a resident moving within a fixed period of time that the resident is in an abnormal condition. Thus, based on standing wave analysis, detection range can be expanded and high accuracy of detecting abnormality can be achieved. Information obtained with such detection can be transmitted back to the main control module (11) to be recorded in the PHD so that in case of abnormality, images and information so detected can be transmitted to a hospital to obtain remote emergent medical treatment instructions and may also serve as surveillance for the elder and young home members in a normal condition. The IP setting indicator (141) is generally provided for the image pickup module (16) to set instructions. The chip of the main control module (11) may use infrared transmission and receiving, voice or wireless control to connect with the detection module (13) to achieve automatic control of general household electric appliances, including air cooling/heating devices, air purification devices, dehumidification devices, televisions, and lights, to allow lights to be automatically turned on when a user enters a living room and to allow the associated electrical appliance to be activated according to the setting made by a user and to have the lights and the associated electrical appliance automatically shut down when the user leaves. The main control module (11) is provided therein with for example WIFI, Bluetooth, or other communication techniques and may conduct detection via connection to door/window sensors corresponding thereto. For example, the sensors mounted to doors and windows can be connected to the main control module (11) for identifying intrusion through the doors and windows. In case of invasion, the main control module (11) activates the image pickup module (16) and gives an instruction to conduct operations including making the illumination module (12) or the alarm module (14) flashing or lighting, driving the sound effect module (15) to start up broadcasting and notifying the user or reporting to police stations to greatly improve home security.

The above-described structural arrangement is made such that flashing reminders by means of the detection module (13) and alarm light module (14) and the sound effect module (15), in combination with processing of feedback data carried out by the main control module (11), make is possible to effectively maintain a secured and comfortable living environment in the house. Further, better and wider range of surveillance or monitoring can be achieved with the camera (161) that covers a range of 360 degrees, so that a user name list may be entered in advance before an event occurs to achieve prevention and in case of no response to reminders and data continuously increasing to reach an extremely dangerous level, information may be transmitted through a network to a fire department, where the information transmitted includes currently detected on-site gas concentration, address, images, or other data (such as PHD that may be transmitted to a nearby hospital or clinic where the user is registered to allow the hospital or clinic to access related information, where it is apparent that data exchange certificate may be made in advance to ensure information security or a manufacturer of the product may provide a dedicated server for such purposes), in order to allow field operation personnel to fully realize and handle the on-site conditions.

Figure 4:
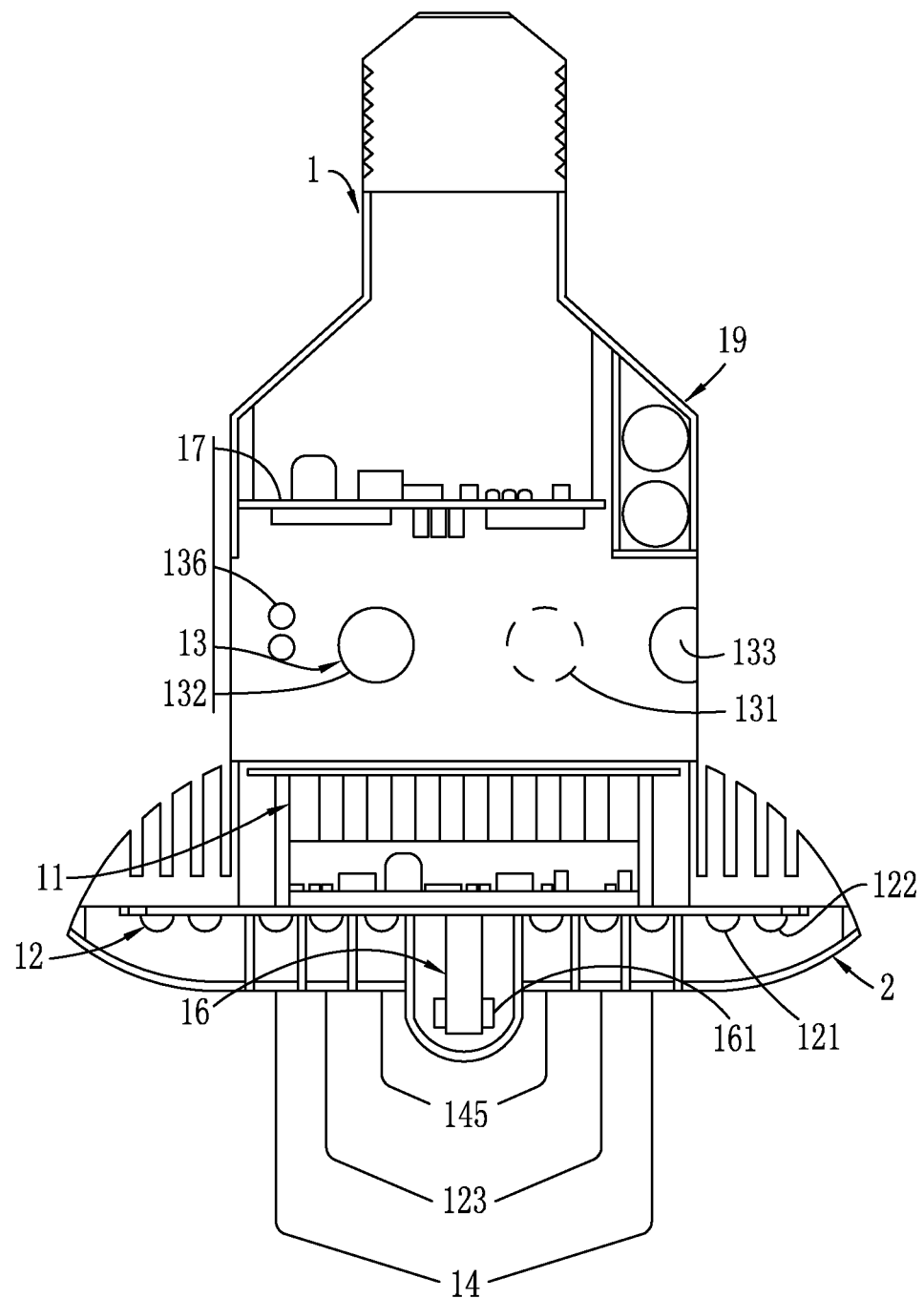
FIG. 4 is a schematic view illustrating inside structure of a second embodiment of the present invention.
Figure 5:
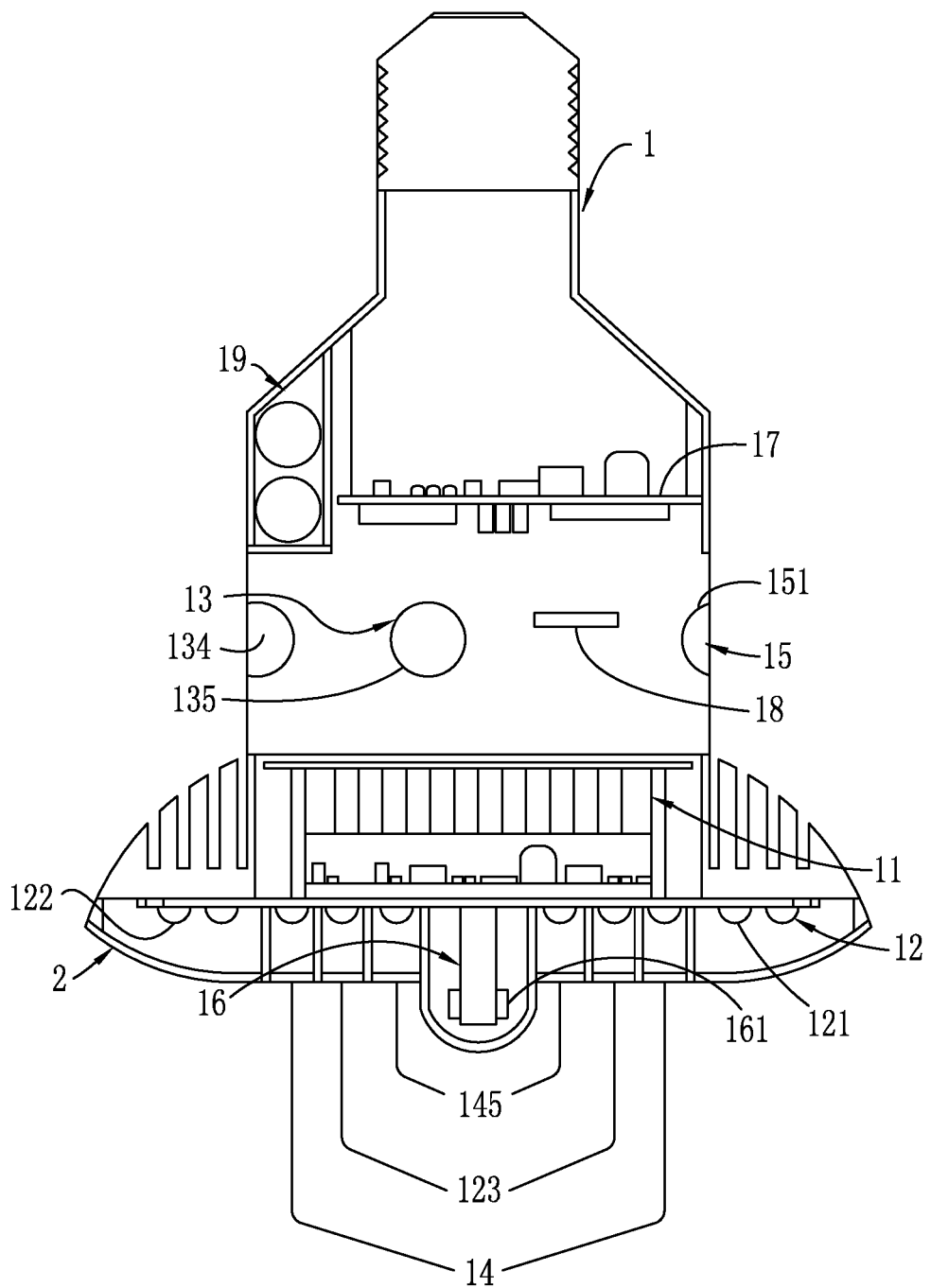
FIG. 5 is a schematic view, taken from an opposite side, illustrating the inside structure of the second embodiment of the present invention.
Figure 6:
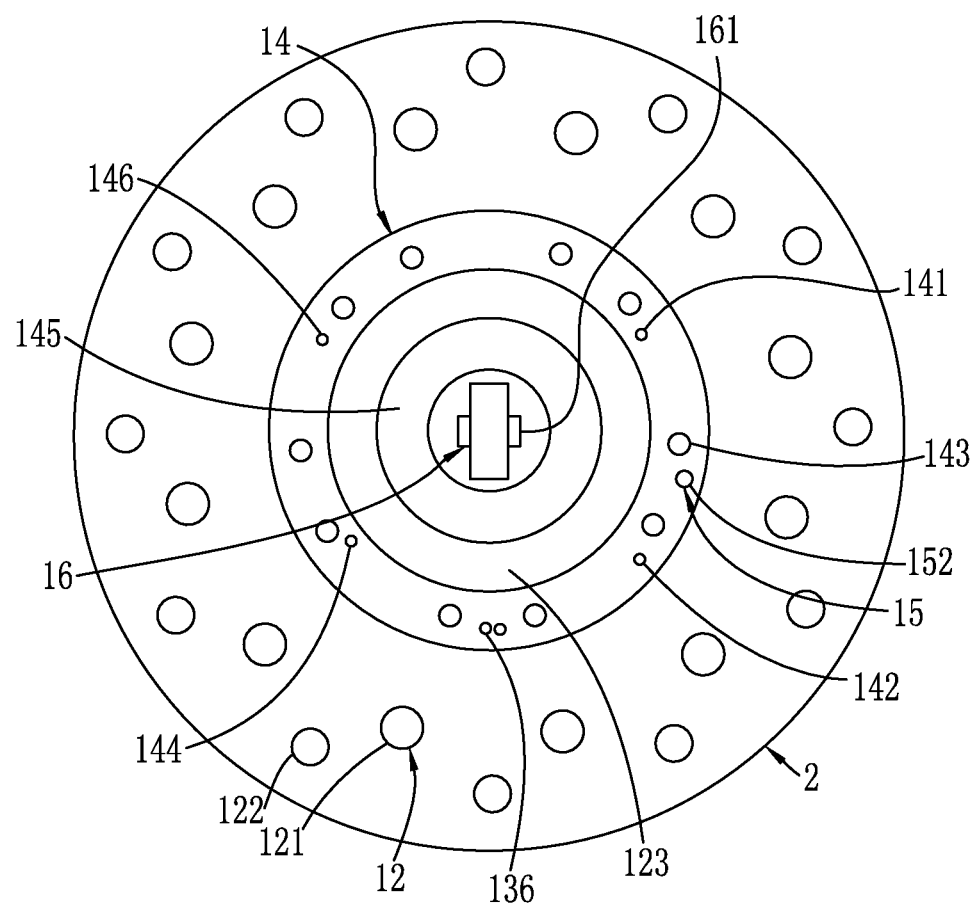
FIG. 6 is a schematic bottom view of a lighting apparatus according to the second embodiment of the present invention.

In a second embodiment of the present invention, as shown in FIGS. 4-6, a major change is that the image pickup module (16) is set at a location at a center of the cover (2) of the lighting device (1) is a lightly projecting manner such that a lens of the camera (161) is more flexible in adjustment so that, compared to the arrangement of being fixed inside the lighting device (1) in the previous embodiment, adjustment of angle can be carried out in an easier way, allowing for minute adjustment of angles in both horizontal and vertical directions. In addition, the secondary illumination light (123) is also adjusted for the location at which the light is set. In the first and second embodiments, both are provided for a spherical bulb design and although only minor variations have been made in the structure thereof, applications thereof can be extended to lighting fixtures having different spaces.

Figure 7:
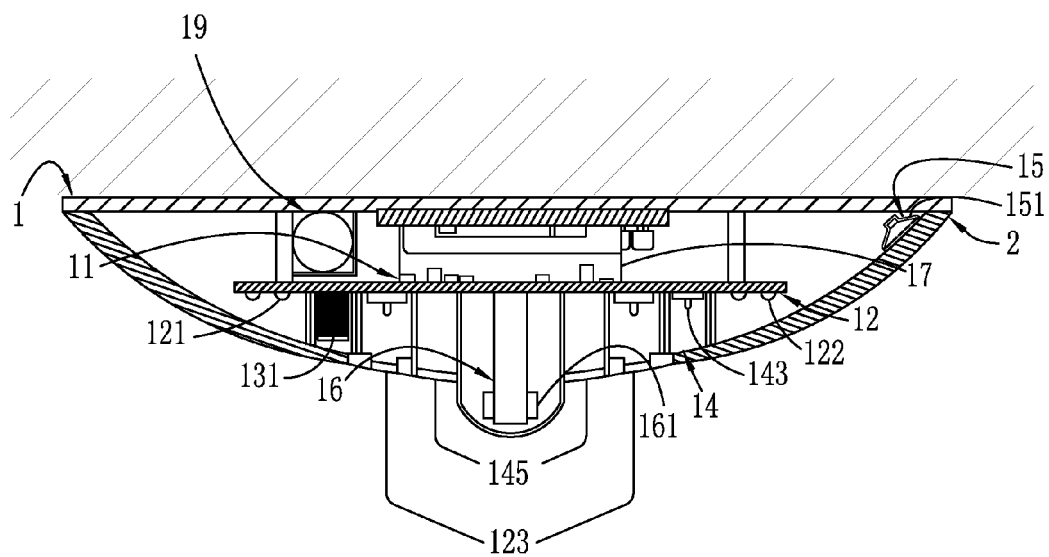
FIG. 7 is a schematic view illustrating inside structure of a third embodiment of the present invention.
Figure 8:
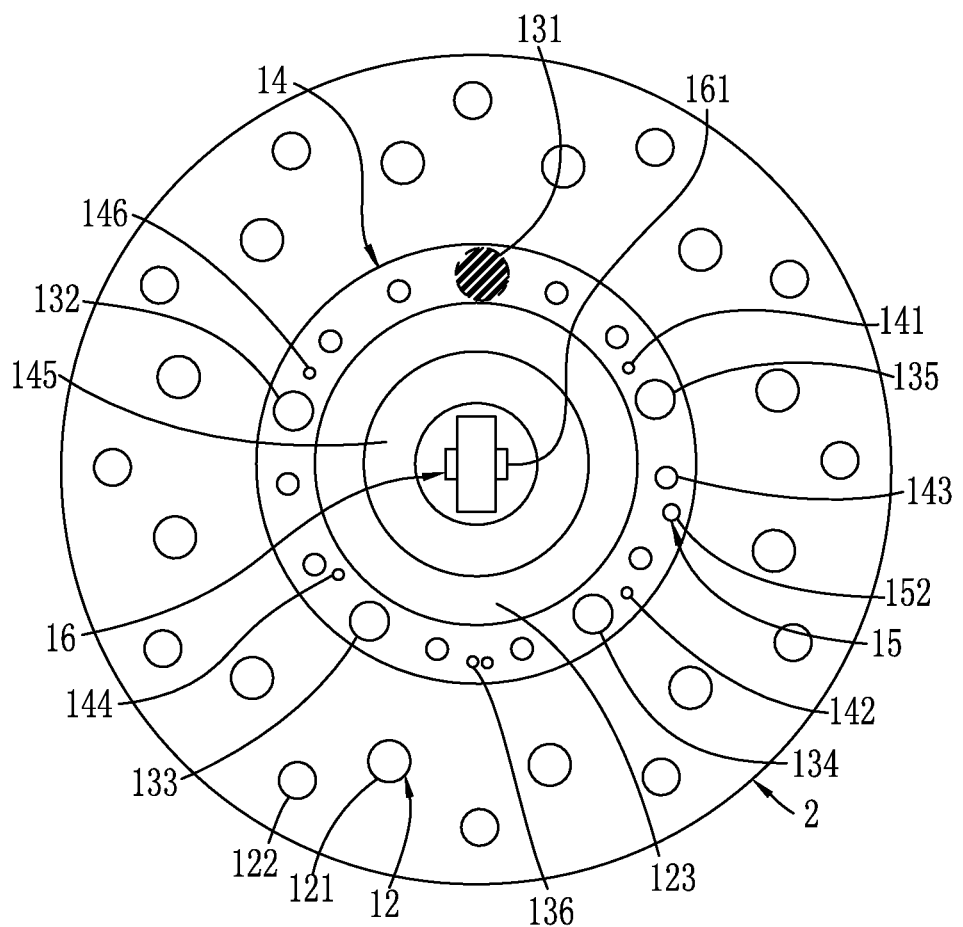
FIG. 8 is a schematic bottom view of a lighting apparatus according to the third embodiment of the present invention.
Figure 9:
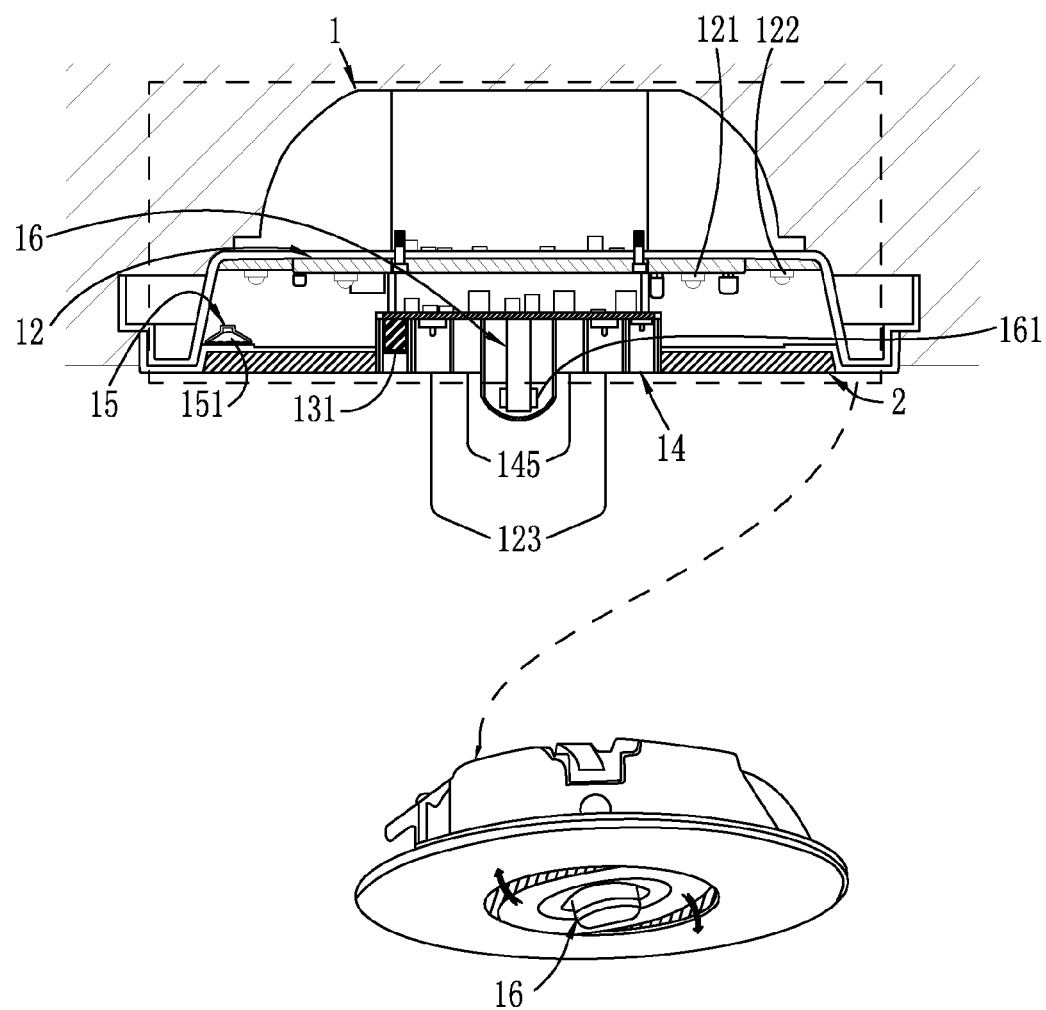
FIG. 9 is a schematic view illustrating an embedded light as a fourth embodiment of the present invention.
Figure 10:
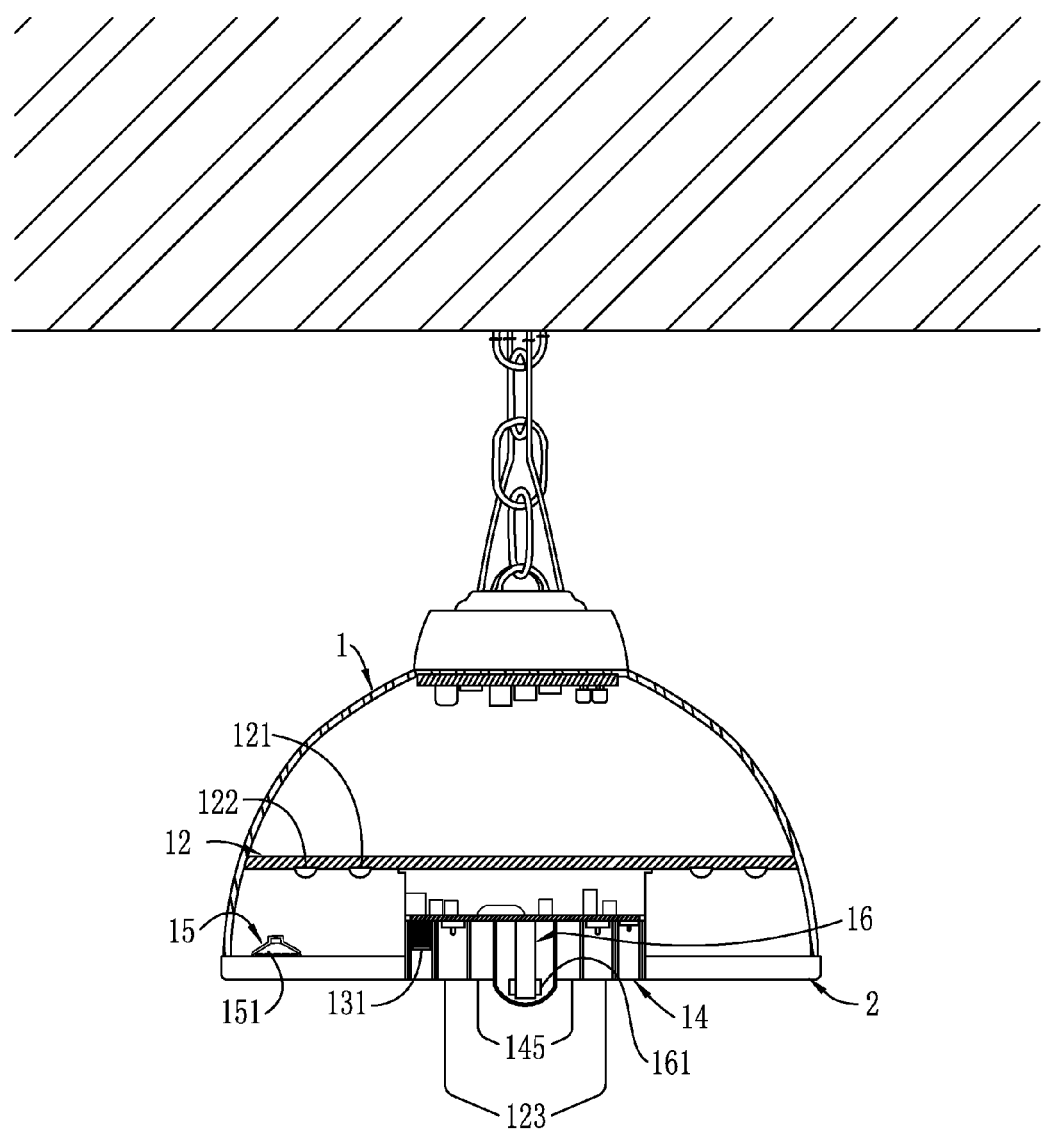
FIG. 10 is a schematic view illustrating a bay light as a fifth embodiment of the present invention.
Figure 11:
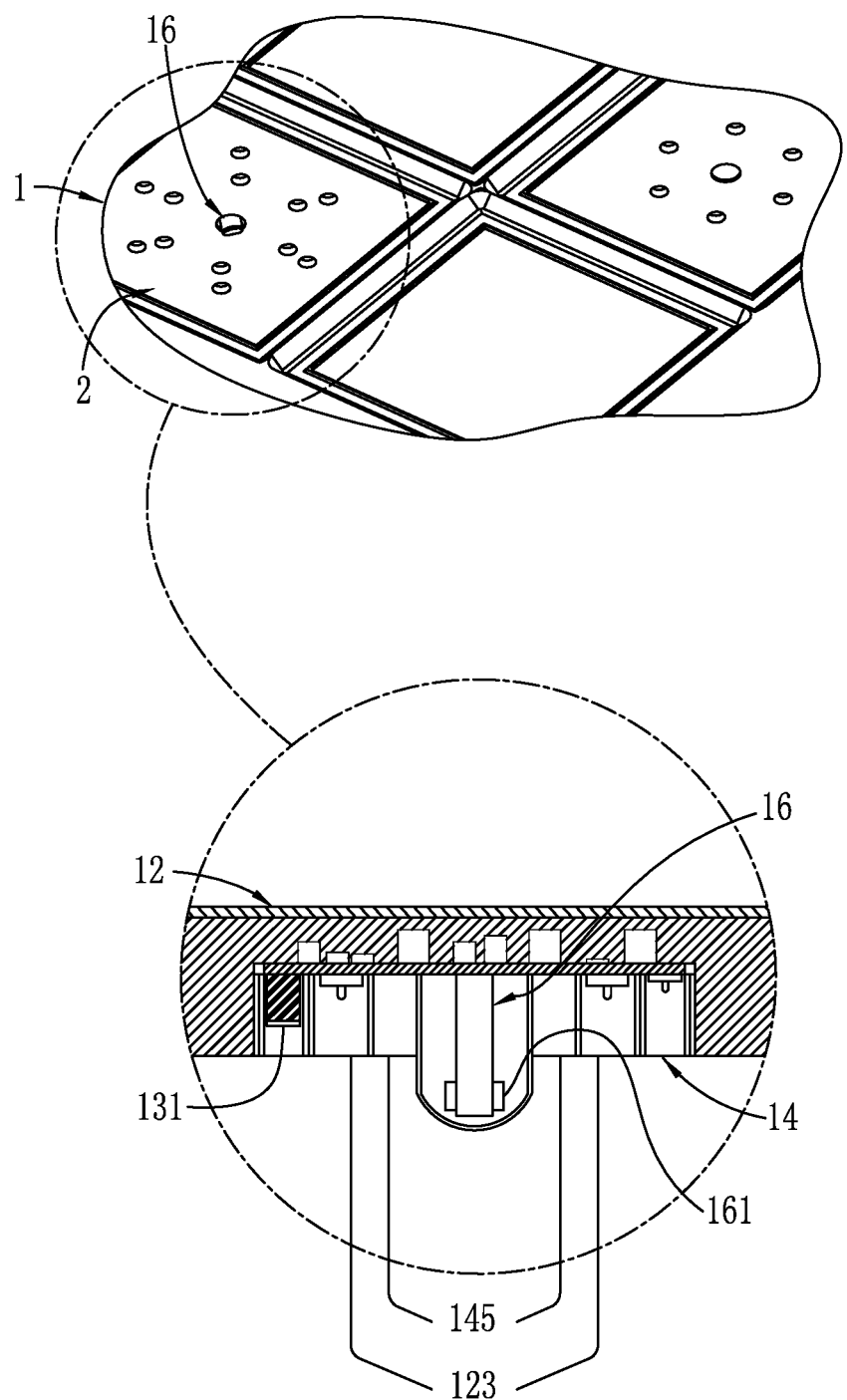
FIG. 11 is a schematic view illustrating a flat fluorescent light as a sixth embodiment of the present invention.
Figure 12:
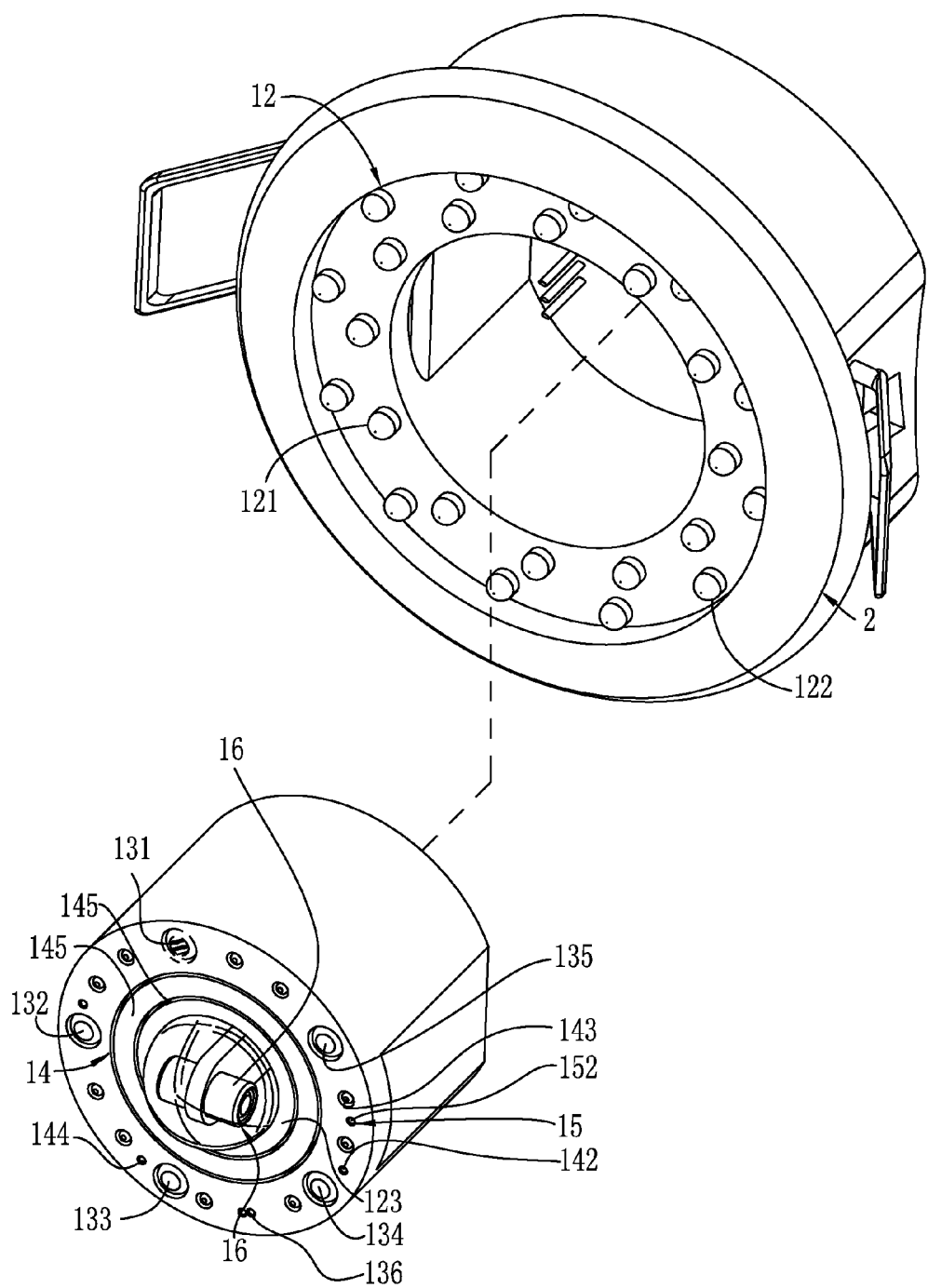
FIG. 12 is a schematic view illustrating another example of the embedded light of the fourth embodiment of the present invention.
Figure 13:
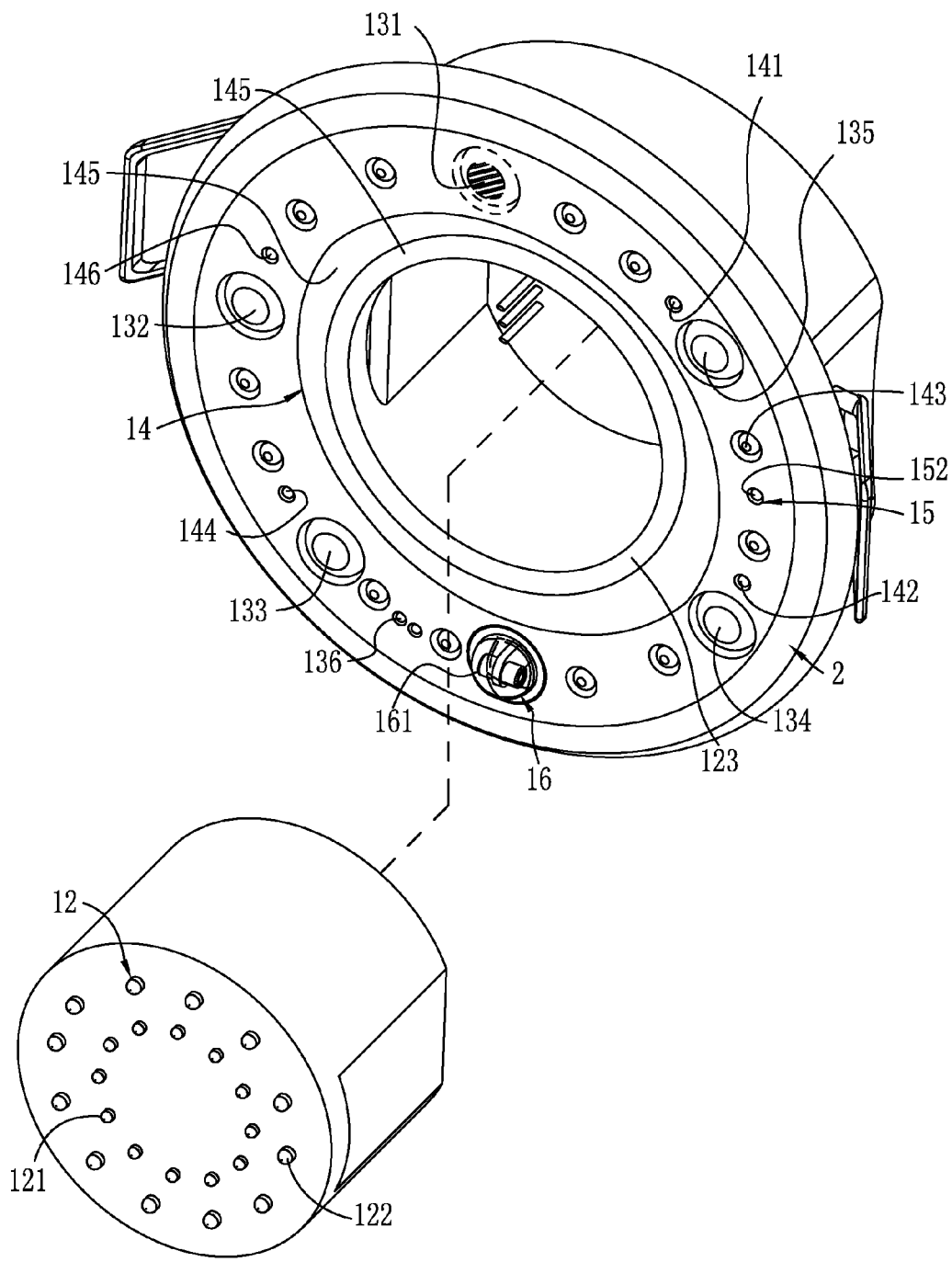
FIG. 13 is a schematic view illustrating a further example of the embedded light of the fourth embodiment of the present invention.

Further, as shown in FIGS. 7-13, lighting fixtures that are illustrated in the drawings are, in sequence, a ceiling light, an embedded light, a bay light, and a flat fluorescent light, and two additional types of embedded light. The ceiling light illustrated in FIG. 7 shows there is small interior space and the lighting device (1) has at least a part comprising the light-transmittable cover (2). The lighting device (1) is provided, in the interior thereof, with the illumination module (12), the detection module (13), the alarm module (14), the sound effect module (15), and the image pickup module (15). The image pickup module (15) is at least one camera (161) arranged in in the interior of the lighting device (1) at a view angle such as not to repeatedly capture images. The lighting device (1) is further provided, in the interior thereof, with a main control module (11). The main control module (11) is electrically connected to the above-motioned modules for determination and connection with household appliances to allow images captured by the image pickup module (16) and detected information of all the modules to be further analyzed to provide a corresponding instruction. It can be seen from a bottom view that the arrangement is such that the image pickup module (15) is set at the center and the air quality indicator (145), the secondary illumination light (123), and the detection module (13) and the alarm module (14) are arranged sequentially toward the outside and the outermost circle is the warm light LEDs (121) and the cold light LEDs (122). Such an arrangement allows for great reduction of the space occupied thereby and enables application thereof to lighting fixtures having small interior spaces. Further reference is made to FIGS. 12 and 13, structures of two different embedded lights are illustrated, wherein the interior structure is similar to those of the previous embodiments, while the feature is that replacement can be easily conducted through push and pressing, making the subsequent inspection and maintenance convenient.

In summary, the present invention provides a smart home-care lighting system, which comprises a main control module (11) that includes, arranged therein, a chip or chips for establishing connection with household electrical appliances, a chip or chips for storing PHD, and a microprocessor so as to integrate information provided from a detection module (13) and an image pickup module (16) and also comprises an illumination module (12), an alarm module (14), a sound effect module (15) operable in combination therewith to realize home care of health and security condition of home members in a dead zone free and coverage range extended manner and can be used in combination with household electrical appliance and communications to establish interconnected applications. The present invention is more financially favorable than home caring devices of the same kind and requires no additionally installed sensor devices, while providing accurate operation of detection and allowing for storage of personal data of users, making it more flexible and function rich in application of smart homes.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A smart home-care lighting system, comprising:
a lighting device, of which at least a part comprises a cover;
an illumination module that is arranged in the interior of the lighting device to project illumination lighting to the outside through the cover;
a detection module that is arranged in the interior of the lighting device to detect environment conditions of the outside of the lighting device and is connected to an alarm module;
a sound effect module that are also arranged in the interior of the lighting device for purposes of indication and reminder;
an image pickup module that comprises at least two or more than two cameras arranged in the interior of the lighting device at locations that are set in such a way as not to repeatedly capture images; and
a main control module that is arranged in the interior of the lighting device and electrically connected to each of the above modules to receive information for comparison with thresholds preset in the main control module to activate or de-activate a corresponding function;

wherein the illumination module further comprises a warm light LED, a cold light LED, and a secondary illumination light, the warm light LED and the cold light LED are arranged in an annularly and circumferentially around the secondary illumination light to form a dualcircle circumferential arrangement, where the warm light LED is in an inner circle and the cold light LED is in an outer circle.

2. The smart home-care lighting system according to claim 1, wherein the detection module further comprises:
- a living organism identification module that detects a location of a target object;
- a humidity/temperature sensor module that detects temperature/humidity of an environment outside the lighting device;
- a smoke sensor module that detects smokes outside the lighting device;
- a gas sensor module that detects harmful gases outside the lighting device;
- an air sensor module that detects contents of suspending particles in the environment outside the lighting device; and
- an infrared transceiver that receives an input of an external signal, the infrared transceiver and voice and wireless control for signal transmission;

wherein each of the modules feeds information back to the main control module for identification of the target object and environment setting references to activate and de-activate a corresponding function.

3. The smart home-care lighting system according to claim 1, wherein the alarm module further comprises a IP setting indicator, a temperature/humidity indicator, a smoke/gas alarm light, a gas indicator, an air quality indicator, and a smoke indicator, which are each driven to give off light as an indication based on determination made according to information acquired by the detection module and fed back to the main control module.

4. The smart home-care lighting system according to claim 1 further comprising: a power supply board, the power supply board being in electrical connection with the main control module; and a backup power compartment, which receives an additional power supply device to install therein and in electrical connection with the power supply board to supply additional electrical power in case of shortage of power supply.

5. The smart home-care lighting system according to claim 1, wherein the camera is set at a location that is at a center of the cover and slightly projects outward.

6. The smart home-care lighting system according to claim 1, the camera has a viewable angle of 180 degrees and at least two cameras are selectively used in combination to cover a range of 360 degrees so as to provide a full-view, dead-zone-free range of surveillance.

7. The smart home-care lighting system according to claim 1, wherein the number of detection module is selectively increased or decreased during the manufacture thereof.

8. The smart home-care lighting system according to claim 1, wherein the main control module, the illumination module, the detection module, and the alarm module are each embodied in the form of a single board arrangement or a multiple board arrangement.

* * * * *